United States Patent
Luethen et al.

(10) Patent No.: US 9,171,656 B2
(45) Date of Patent: Oct. 27, 2015

(54) ELECTRICALLY INSULATING NANOCOMPOSITE HAVING SEMICONDUCTING OR NONCONDUCTIVE NANOPARTICLES, USE OF THIS NANOCOMPOSITE AND PROCESS FOR PRODUCING IT

(75) Inventors: Volkmar Luethen, Berlin (DE); Gabriele Winkler, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 221 days.

(21) Appl. No.: 13/876,903
(22) PCT Filed: Sep. 15, 2011
(86) PCT No.: PCT/EP2011/066013
§ 371 (c)(1), (2), (4) Date: Mar. 29, 2013
(87) PCT Pub. No.: WO2012/041715
PCT Pub. Date: Apr. 5, 2012

(65) Prior Publication Data
US 2013/0187099 A1 Jul. 25, 2013

(30) Foreign Application Priority Data
Sep. 29, 2010 (DE) .................. 10 2010 041 630

(51) Int. Cl.
*H01B 1/06* (2006.01)
*H01B 1/24* (2006.01)
(Continued)

(52) U.S. Cl.
CPC *H01B 1/124* (2013.01); *C08K 3/04* (2013.01); *C08L 1/00* (2013.01); *H01B 3/004* (2013.01); *H01B 3/48* (2013.01); *Y10T 156/10* (2015.01)

(58) Field of Classification Search
CPC .............. C08L 1/02; C08L 5/00; C08K 3/38; H01B 3/004

USPC ............ 252/500, 511; 156/60; 428/34.2; 524/404

See application file for complete search history.

(56) References Cited

U.S. PATENT DOCUMENTS

| | | | |
|---|---|---|---|
| 4,521,450 A | 6/1985 | Bjorklund et al. | |
| 4,898,921 A | 2/1990 | Humphrey et al. | |

(Continued)

FOREIGN PATENT DOCUMENTS

| CN | 1867626 A | 11/2006 |
|---|---|---|
| DE | 33 21 281 A1 | 12/1983 |

(Continued)

OTHER PUBLICATIONS

Mendez, J., et al., "Synthesis, electrical properties, and nanocomposites of poly (3,4-ethylenedioxythiophene) nanorods", Polymer Chemistry, May 2010, pp. 1237-1244, vol. 1, No. 8, Royal Society of Chemistry, Cambridge, England.

(Continued)

*Primary Examiner* — Khanh Tuan Nguyen
(74) *Attorney, Agent, or Firm* — Laurence A. Greenberg; Werner H. Stemer; Ralph E. Locher (57) ABSTRACT

A cellulose material contains cellulose fibers having an impregnation. Accordingly, the impregnation is made of nanoparticles, in particular BNNT, containing a shell of polymers, in particular PEDOT:PSS. The impregnation forms a type of network that can reduce the specific resistance of the cellulose material due to the electrical conductivity of the network. The cellulose material can thereby be advantageously adapted to corresponding applications with respect to the electrical properties thereof. The cellulose material can thus also be used to electrically insulate transformers, wherein the cellulose material is thereby saturated with transformer oil and an adaptation of the specific resistance of the cellulose material to the specific resistance of the oil leads to improved dielectric strength of the transformer insulation. A method for producing the cellulose material described above contains a suitable impregnation step for the cellulose material.

15 Claims, 4 Drawing Sheets (51) Int. Cl.
*H01B 1/12* (2006.01)
*C08K 3/04* (2006.01)
*H01B 3/00* (2006.01)
*H01B 3/48* (2006.01)
*C08L 1/00* (2006.01)

(56) References Cited

U.S. PATENT DOCUMENTS

| | | | |
|---|---|---|---|
| 5,061,554 | A | 10/1991 | Hjortsberg et al. |
| 7,479,516 | B2 | 1/2009 | Chen et al. |
| 7,868,079 | B2 | 1/2011 | Önneby et al. |
| 2005/0165155 | A1 | 7/2005 | Blanchet-Fincher |
| 2007/0199729 | A1 | 8/2007 | Siegel et al. |
| 2008/0142762 | A1 | 6/2008 | Ni et al. |
| 2008/0179077 | A1 | 7/2008 | Krivda et al. |
| 2009/0221734 | A1* | 9/2009 | Kuwahara et al. ............ 524/404 |
| 2009/0246521 | A1 | 10/2009 | Swift et al. |
| 2010/0009165 | A1 | 1/2010 | Patel et al. |

FOREIGN PATENT DOCUMENTS

| | | |
|---|---|---|
| DE | 10 2007 018 540 A1 | 10/2008 |
| EP | 0 287 814 A1 | 10/1988 |
| EP | 0 294 231 A1 | 12/1988 |
| EP | 0 783 015 A1 | 7/1997 |
| EP | 2 112 192 A2 | 10/2009 |
| JP | 2008031206 A | 2/2008 |
| WO | 2004/038735 A1 | 5/2004 |
| WO | 2004/106420 A2 | 12/2004 |
| WO | 2006/122736 A2 | 11/2006 |
| WO | 2006/131011 A1 | 12/2006 |
| WO | 2008/123326 A1 | 10/2008 |
| WO | 2011/003634 A1 | 1/2011 |
| WO | 2011/003635 A1 | 1/2011 |

OTHER PUBLICATIONS

Du, F., et al., "Effect of nanotube alignment on percolation conductivity in carbon nanotube/polymer composites", Physical Review B, Sep. 2005, pp. 121404-1 to 121404-4, vol. 72, No. 12, American Physical Society, College Park, Maryland, USA.

Tang, C., et al., "Fluorination and Electrical Conductivity of BN Nanotubes", Journal of the American Chemical Society, 2005, pp. 6552-6553, vol. 127, No. 18, Published on Web Apr. 15, 2005, URL: http://wls.iphy.ac.cn/Chinese/kjdt2005/0518_11.pdf.

Chang, C.W., et al., "Isotope Effect on the Thermal Conductivity of Boron Nitride Nanotubes", Physical Review Letters, Aug. 2006, pp. 085901-1 to 085901-4, vol. 97, No. 8, URL: http://www.physics.berkeley.edu/research/zettl/pdf/322.PRL97-085901chang.pdf.

* cited by examiner

$U_o \approx \frac{1}{2} U_p$
$U_o \approx \frac{1}{2} U_{comp}$ $U_o \approx \frac{1}{1000} U_p$
$U_o \approx U_{comp}$

FIG 4

ELECTRICALLY INSULATING NANOCOMPOSITE HAVING SEMICONDUCTING OR NONCONDUCTIVE NANOPARTICLES, USE OF THIS NANOCOMPOSITE AND PROCESS FOR PRODUCING IT

BACKGROUND OF THE INVENTION

Field of the Invention

The invention relates to a nanocomposite having semiconducting or nonconductive nanoparticles which are dispersed in an electrically insulating material. In addition, the invention relates to a use of this nanocomposite. Finally, the invention also relates to a process for producing a nanocomposite-forming cellulose material in which semiconducting or nonconductive nanoparticles are present.

U.S. Pat. No. 4,521,450 discloses that an impregnatable material composed of cellulose fibers can be dipped into an aqueous oxidant, e.g. a weakly acidic solution of iron(III) chloride solution, cerium(IV) sulfate, potassium hexacyanoferrate(III) or molybdophosphoric acid. The moist cellulose material is subsequently either treated with liquid or gaseous pyrrole compounds at room temperature until the pyrrole is, as a function of the concentration of the oxidant, polymerized. The cellulose material which has been impregnated in this way is dried at room temperature for 24 hours. The oxidant serves firstly to polymerize the pyrrole compounds and also to increase the electrical conductivity. The specific resistance $\rho$ of such impregnated cellulose materials can thus be influenced via the concentration of pyrroles and the type of oxidant. In the production of the impregnated cellulose material, the toxicity of the pyrrole has to be taken into account by suitable working conditions and appropriate disposal of waste.

Furthermore, it is known that nanocomposites can also be used as field-gradating material when the objective is to reduce peaks in the formation of electric fields, for example at the insulating of electrical conductors. According to WO 2004/038735 A1, a material consisting of a polymer can be used for this purpose. A filler whose particles are nanoparticles, i.e. have an average diameter of not more than 100 nm, is dispersed in this material. According to U.S. 2007/0199729 A1, it is possible to use, inter alia, semiconducting materials whose band gap is in the range from 0 eV to 5 eV for such nanoparticles. The electrical resistance of the nanocomposite can be set by means of the nanoparticles used, which can, for example, consist of ZnO. If a particular proportion of the volume, which is, depending on the size of the nanoparticles, from 10 to 20% by volume, is exceeded when mixing in the nanoparticles, the specific resistance of the nanoparticles is reduced noticeably, which enables the electrical conductivity of the nanocomposite to be set and matched to the conditions required. In particular, a specific resistance in the order of magnitude of $10^{12}$ $\Omega$m can be set. This comparatively high electrical resistance leads, when an electrical component which is coated with the nanocomposite is subjected to stress, to a particular loss current having to be accepted when a DC voltage is applied. However, a voltage drop over the nanocomposite is obtained and results in more uniform distribution of the potential and thus also produces a suitable gradient in the electric field formed. In this way, the field peaks formed can be reduced, as a result of which the breakdown resistance is advantageously increased.

When an alternating voltage is applied to the electric conductor, a field-gradating effect likewise arises, but this is due to a different mechanism. The field-weakening effect of the nanocomposite depends in this case on the permittivity of the nanocomposite, where the permittivity $\in$ is a measure of the permeability of a material for electric fields. The permittivity is also referred to as the dielectric constant, but the term "permittivity" will be used in the following. The relative permittivity is the ratio of the permittivity $\in$ of a material to the electric field constant $\in_0$, which indicates the permittivity of free space, designated as $\in_r = \in/\in_0$. The higher the relative permittivity, the greater is the field-weakening effect of the material used relative to free space (vacuum). In the following, only the relative permittivities of the materials used will be considered.

Furthermore, generally known carbon nanotubes (hereinafter referred to as CNTs) and boron nitride nanotubes (hereinafter referred to as BNNTs) are considered to be nanoparticles. Although these structures have a length of a few microns, they have diameters of less than 100 nm and are therefore regarded as nanoparticles. As can be seen from, for example, C. W. Chang et al., "Isotope Effect on the Thermal Conductivity of Boron Nitride Nanotubes", Physical Review Letters 97, (2006), the properties of nanotubes are greatly dependent on their diameter. For example, the thermal conductivity of CNTs and BNNTs increase with decreasing diameter of these nanotubes. It is known from F. Du et al., "Effect of nanotube alignment on percolation conductivity in carbon nanotube/polymer composites" Physical Review B 72, (2005), that CNTs in polymer composites have substantially lower percolation thresholds for producing electrical conductivity in the composite than, for example, spherical nanoparticles. The percolation threshold can be increased further by measures to orient the CNTs in the matrix of the polymer and can be a content of CNTs in the matrix of less than 1% by weight. In addition, it is known from C. Tang et al., "Fluorination and Electrical Conductivity of BN Nanotubes", Journal of American Chemical Society 127, (2005), pages 6552 to 6553 (including Supporting Information), that the semiconducting properties of BNNTs can, similarly to those of massive semiconductors, be influenced in terms of electrical conductivity by doping with various dopants.

According to DE 10 2007 018 540 A1, introduction of CNTs into, for example, transparent conductive polymers is also known. It is in this way possible to realize, for example, resistance heating elements on motor vehicle windscreens whose transparency can also be set in a targeted manner in this way. It is thus also possible to realize tinted windows. Electrically conductive polymers which may be mentioned are, for example, polypyrroles, polyaniline, polythiophenes, polyparaphenylenes, polyparaphenylene-vinylenes and derivatives of these aforementioned polymers. An example of a polyaniline, namely PEDOT marked by Bayer AG, for example under the trade name Baytron, may additionally be mentioned. PEDOT has the systematic name poly(3,4-ethylenedioxythiophene).

BRIEF SUMMARY OF THE INVENTION

It is an object of the invention to provide a nanocomposite having semiconducting or nonconductive nanoparticles in an electrically insulating material and also a process for producing such a nanocomposite, which makes simplified production possible. An additional object of the invention is to indicate a use for such a nanocomposite.

The stated object is achieved according to the invention by the nanocomposite indicated at the outset in which the insulating material comprises a cellulose material and at least part of the nanoparticles dispersed in the insulating material have a shell composed of an electrically conductive polymer. As a cellulose material, it is possible to use, for example, a paper, cardboard or pressboard. All other forms of cellulose material are conceivable. The cellulose material has a structure composed of cellulose fibers which in their totality make up the agglomerate forming the cellulose material. As semiconducting or nonconductive nanoparticles, it is possible to use, for example, Si, SiC, ZnO, BN, GaN, AlN or C. As electrically conductive polymers, it is possible to employ the polymers mentioned above and in DE 10 2007 018 54 A1.

According to the invention, envelopment of the nanoparticles used with the electrically conductive polymers leads to the electrical conductivity of the nanoparticles being increased by the shell. If the nanoparticles are distributed in the cellulose material, this therefore leads to an increase in the electrical conductivity or to a reduction in the specific resistance. In this way, the cellulose material can be adapted to different tasks when these require a particular electrical conductivity of the cellulose material.

A further advantage of the nanocomposite of the invention is that the thermal stability of the nanocomposite is comparatively high. Owing to the generally known thermal stabilities of PEDOT, PSS, the polymer formed from the individual ionomers, at 200° C. and PANI at 300° C., a thermal stability which is not greater than that of the polymers used is to be expected per se. However, nanoparticles such as BNNTs have thermal stabilities of up to 1100° C. It has now surprisingly been found that envelopment of the thermally stable nanoparticles with ionomers such as those indicated above also leads to an increase in the thermal stability of the enveloping polymers. Use of the nanoparticles thus advantageously enables, overall, an improved thermal stability of the composite of the invention to be attained.

In particular, crosslinking of the conductive polymers can be concluded only in the cellulose material when the nanoparticles are firstly enveloped with precursors of these polymers or with as yet incompletely polymerized polymers before introduction into the cellulose material. A final polymerization can then be carried out when the cellulose material has already been impregnated with the nanoparticles, with connecting polymer threads similar to bridges being formed between adjacent nanoparticles so as to form an electrically conductive network in the agglomerate of the cellulose material. Here, a comparatively large increase in the electrical conductivity can advantageously be achieved using a small outlay of material for the impregnation.

The use of conductive polymers prepared from a mixture of positively charged ionomers and negatively charged ionomers is particularly advantageous. As negatively charged ionomer, it is possible to use, for example, PSS. This is polystyrenesulfonate. As positively charged ionomer, it is possible to use the abovementioned PEDOT or PANI (this is polyaniline). Mixtures of these two positively charged ionomers can also be used. The ionomers then polymerize as a result of a suitable heat treatment, forming the abovementioned polymer networks which extend through the cellulose material and reduce the specific resistance thereof. The ionomers mentioned are, particularly as a result of their solubility in water, advantageously particularly simple to process in a process for producing the cellulose material. This is because the production process for the cellulose material (for example paper production) is likewise a water-based process in which, unlike the prior art for the impregnation of the cellulose material, it is not necessary to use an oxidant when the ionomers are employed. In addition, the ionomers mentioned are also nontoxic, and disposal of the production wastes is therefore unproblematical. The production process is advantageously greatly simplified thereby.

In an advantageous embodiment of the invention, the nanoparticles can be BNNTs (boron nitride nanotubes). These are semiconducting nanoparticles having a band gap of about 5.5 eV. The specific resistance can be influenced by the BNNTs in a similar way as by the CNTs in the above-described manner. In addition, BNNTs can advantageously be doped with dopants, which makes possible not only coating with electrically conductive polymers but also provides a further parameter for setting the specific resistance of the BNNTs and thus also the cellulose material.

A nanocomposite having semiconducting or nonconductive nanoparticles can be used for achieving the abovementioned object, in particular as insulating material for a transformer. In the case of this nanocomposite, at least part of the nanoparticles dispersed in the insulating material is, according to the invention, provided with a shell of electrically conductive polymers. In addition, the nanocomposite comprises a cellulose material in which the nanoparticles are dispersed. What has been said above applies analogously to this insulating material and the use of electrically conductive polymers and the nanoparticles.

The object is achieved according to the invention by a process for producing a cellulose material forming a nanocomposite, in which the following steps are carried out. Firstly, an aqueous electrolyte is firstly produced from a positively charged ionomer and a negatively charged ionomer, in particular PSS. In addition, semiconducting or nonconductive nanoparticles, in particular BNNTs, are dispersed in this electrolyte. This gives a pulp, the starting material for production of paper created from the pulp. As an alternative, the cellulose fibers can also be impregnated with the electrolyte. A prerequisite for this is that a raw material which contains cellulose fibers and is preferably present in dry form or in a dewatered state is available, so that the electrolyte can be brought into contact with this intermediate. In the next step, the water is removed from the electrolyte at least to such an extent that the cellulose material is formed. This means that the cellulose material already forms a handleable agglomerate which can be used as the basis for further processing. This is carried out by dewatering, for example, as known from paper production, by allowing the pulp to drift on a screen, and also mechanical pressing and heating. Finally, the ionomers are crosslinked. A heat treatment above the crosslinking temperature of the ionomers concerned is preferably required for this purpose. As a result, the abovementioned network of polymers, which is electrically conductive and therefore reduces the specific resistance of the cellulose material, is formed as a result.

However, it is not only the network of the electrically conductive polymer which is responsible for reducing the specific resistance. The nanoparticles, in particular the BNNTs, are also present within this network and these likewise contribute to reducing the specific resistance. At the same time, the thermal stability of the cellulose material is increased in the manner described above, by use of the nanoparticles.

In an advantageous embodiment of the process, PEDOT and/or PANI are used as positively charged ionomers. The advantages associated with choice of these ionomers have already been described above.

Furthermore, it can advantageously be provided for the removal of the water before crosslinking of the ionomers to be aided by rolling of the cellulose material. This is particularly advantageous in the case of continuous production of the cellulose material since a long sheet can be produced by rolling of the cellulose material. Furthermore, it is advantageous for complete drying of the cellulose material to be carried out after crosslinking of the ionomers. Complete drying enables the required value of the specific resistance to be achieved, and comparatively accurate setting of the specific resistance is advantageously possible via the concentration of the impregnant.

It is also advantageous for the removal of the water and/or crosslinking of the ionomers to be achieved by pressing heated rollers onto the cellulose material. Contact with the heated rollers advantageously allows the heat to be introduced particularly effectively into the cellulose material. The necessary crosslinking temperature can be set in this way. Heating of the cellulose material simultaneously leads to evaporation of the residual water and a drying process therefore occurs. This can be at least induced by the heated rollers, with subsequent drying also being able to be carried out, for example, in a heat chamber.

To be able to produce cellulose materials having a relatively great thickness, it can be advantageous to produce the cellulose material by lamination of a plurality of previously impregnated layers. In this way, it can be ensured that the individual layers of cellulose material are so thin that impregnation at least largely over the total thickness of the layer is made possible. This is also possible when the layers produced are impregnated in the above-described way by the electrolyte, rather than the individual cellulose fibers being impregnated. To arrive, subsequently, at a cellulose material having a relatively great thickness, this is laminated after treatment with the electrolyte to form a multilayer cellulose material. Here, crosslinking and/or drying can be commenced before lamination of the layers. However, it is advantageous to conclude crosslinking only after lamination of the layers since crosslinking of the polymers of different layers among one another can also occur, so as to form the above-described network of polymers extending over all layers. This advantageously enables the specific resistance of even a multilayer cellulose material to be increased to a comparatively great extent by means of comparatively little polymer material.

In a particular embodiment of the invention, the nanoparticles are treated with a wetting agent before they are dispersed in the electrolyte. This makes dispersion in the electrolyte simpler, so that, if required, a relatively large amount of nanoparticles can advantageously be incorporated into the matrix formed by the cellulose material. In this context, it should also be remarked that even the ionomers attached to the nanoparticles are readily soluble in water, so that these, too, have the effect of a wetting agent. These ionomers are present in the electrolyte when the nanoparticles are added to the electrolyte. However, should the effect of the ionomers not be sufficient for producing the dispersion of nanoparticles in the electrolyte, the wetting agents with which the nanoparticles are treated can additionally be used before the nanoparticles are added to the electrolyte. Wetting agents used, in particular for pure or functionalized BNNTs, are gallic acid (3,4,5-trihydroxybenzoic acid) or derivatives thereof, e.g. ethyl gallate, propyl gallate, octyl gallate or dodecyl gallate and also epicatechol gallate or epigallocatechol gallate. In the case of these, a benzene ring present in the molecules enters into a π-π interaction with the side walls of the BNNTs. The OH groups of gallic acid (or derivatives thereof) can then interact with the ionomers such as PANI, PEDOT or PSS. In general, BNNTs can, owing to their Sp2-hybridization, react readily with wetting agents which have benzene rings in their chemical structure. These compounds which have π-electrons in their chemical structure and also substances having C—C double bonds and substances having functional groups such as an OH group, a COOH group, an $NO_2$ group or an $SO_3H$ group, which are in each case attached to an alkenyl radical in linear, branched or cyclic form or to an aryl radical, are likewise fundamentally suitable as wetting agents, especially for BNNTs. The functional groups here ensure solubility in various solvents, depending on the solvent for which they are suitable. For example, BNNTs can be stored as a dispersion in water over 60 days when using ammonium oleate. Ammonium oleate is an ionic surfactant which is a salt of oleic acid which has C—C double bonds.

The cellulose material according to the invention was produced, in one example, under laboratory conditions; the process sequence will be explained in more detail below. A commercially available pressboard (hereinafter referred to as cellulose in as-delivered state) was used. This was firstly cut into 90 mm×50 mm pieces having a thickness of 3.1 mm. These were heated in distilled water at temperatures in the range from 95 to 99° C. while stirring by means of a magnetic stirrer until individual layers in the outer region of the pressboard began to dissolve. In this state, the pressboard was completely soaked with water. The wet pressboard was taken out of the water and separated into its individual layers. The separated layers were once again heated in distilled water at 95-99° C. while stirring until further single sheets became detached. The individual layers and sheets were once again taken out of the water and separated down to the thinnest separable layer. The very thin layers which could no longer be separated mechanically were heated while stirring in distilled water (temperature as above) until individual cellulose fibers were present.

In a next step the pulp obtained in this way was filtered to give thin fabric layers. The individual cellulose threads were filtered off with the aid of a Büchner funnel with application of a reduced pressure. A black band filter from Schleicher & Schöll No. 589 or 595 was used as filter paper. The fabric layers obtained in this way still contained from 270 to 300% of water based on the original weight of the pressboard used. The fabric layers can easily be separated from the black band filter.

In a next step, the individual fabric layers were broken up into individual cellulose threads in an aqueous dispersion of BNNTs enveloped with PEDOT:PSS at room temperature while stirring by means of a magnetic stirrer. Impregnation of the cellulose threads with enveloped BNNTs occurred during this stirring operation. After stirring for one hour, the impregnated cellulose threads were filtered off under reduced pressure on a black band filter according to the above-described principle. The fabric layer formed can easily be detached again from the black band filter. The dispersion with PEDOT:PSS-enveloped BNNTs which had been filtered off was collected in a suction flask and could, after restoring the original concentration of enveloped BNNTs, be passed to reuse.

In a next step, the impregnated fabric layers should be smoothed by rolling. For this purpose, the individual fabric layers were laid on top of one another and gently pressed against one another by means of a flat object. The stack of impregnated fabric layers was subsequently compressed a number of times with increasing pressure by means of a roller. The individual fabric layers were in this operation compacted to form an impregnated fiber felt, with excess liquid being squeezed out. The fabric stack was compacted until the thickness of the fiber felt obtained was about 4-4.5 mm.

In a next step, the polymers should be crosslinked and drying of the cellulose material should be effected. For this purpose, the remaining water was removed by evaporation under pressure between steel plates in a drying oven. The temperature for drying was selected so that crosslinking of the polymer on the BNNTs and among one another firstly took place. For this purpose, the impregnated fiber felt was placed between steel plates. The steel plates were pressed together under a pressure of 2.4 KPa. The support surfaces with which the impregnated fiber felt came into contact were coated with Teflon in order to prevent sticking of the not yet polymerized starting materials to the metal plates. Crosslinking of the polymer was carried out 82° C. and took from 30 to 90 minutes. As soon as crosslinking was concluded, support surfaces made of metal were used for final drying. Final drying is carried out at 104° C. and a pressure of 4.22 KPa and was carried out until the weight and the thickness of the cellulose material no longer changed.

The cellulose materials produced under laboratory conditions enabled the following advantages to be achieved: the electrical properties could be set in a controlled manner by impregnation of the cellulose material with PEDOT:PSS or with PANI:PSS and the BNNTs enveloped by these polymers, so that the specific resistance of the cellulose material could be changed. In addition, the addition of the BNNTs increased the thermal stability of the polymers used. The concentration of BNNTs relative to the cellulose material could be reduced without a shell of polymers, so that this comparatively expensive material had to be processed only in low concentrations. The apparatus could be kept relatively small compared to the use of pyrrole compounds because the polymers used were relatively non toxic.

Due to the good dispersibility of the BNNTs enveloped with the polymers, the production process for the cellulose material could be carried out largely unhindered.

Further details of the invention will be described below with reference to the drawing. Identical or corresponding elements of the drawing are each denoted by the same reference numerals in the individual figures and are explained more than once only in so far as there are differences between the individual figures. In the figures:

DESCRIPTION OF THE INVENTION

Figure 1:
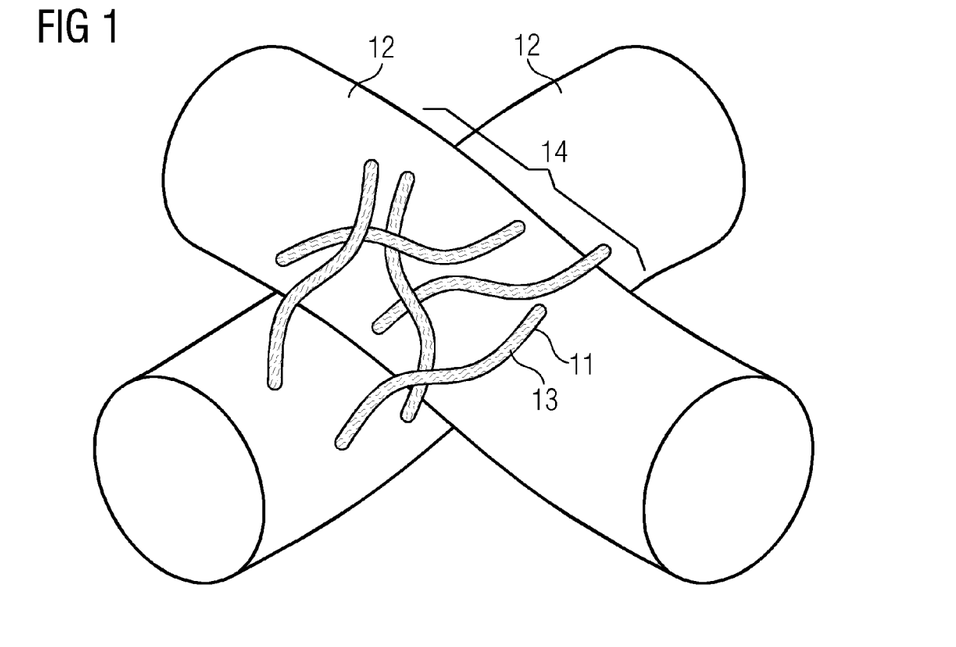
FIGS. 1 and 2 show examples of nanocomposites according to the invention in a three-dimensional view with the use of different nanoparticles.

A nanocomposite as per FIG. 1 is shown only as a small section. This is provided with BNNTs 11 which have been applied to two cellulose fibers 12 which cross one another and represent by way of example the cellulose material. The BNNTs 11 are additionally enveloped by a polymer 13, with a composite having the following structure being formed by these constituents. The polymer 13 is fully polymerized and therefore forms a network which is indicated in the form of thin threads in FIG. 1. This network envelopes the agglomerate of the BNNTs 11, with the BNNTs again forming a network 14. This is present within the shell formed by the polymer 13 since the latter is polymerized only when the BNNTs have already formed the network 14 in the matrix of the cellulose fibers 12. The network 14 of the BNNTs 11 permeates the entire fiber agglomerate, so as to give an electrically conductive, contiguous unit in the cellulose material. This explains the reduction in the specific surface resistance of the cellulose material as shown in FIG. 1 compared to unimpregnated cellulose materials.

Figure 2:
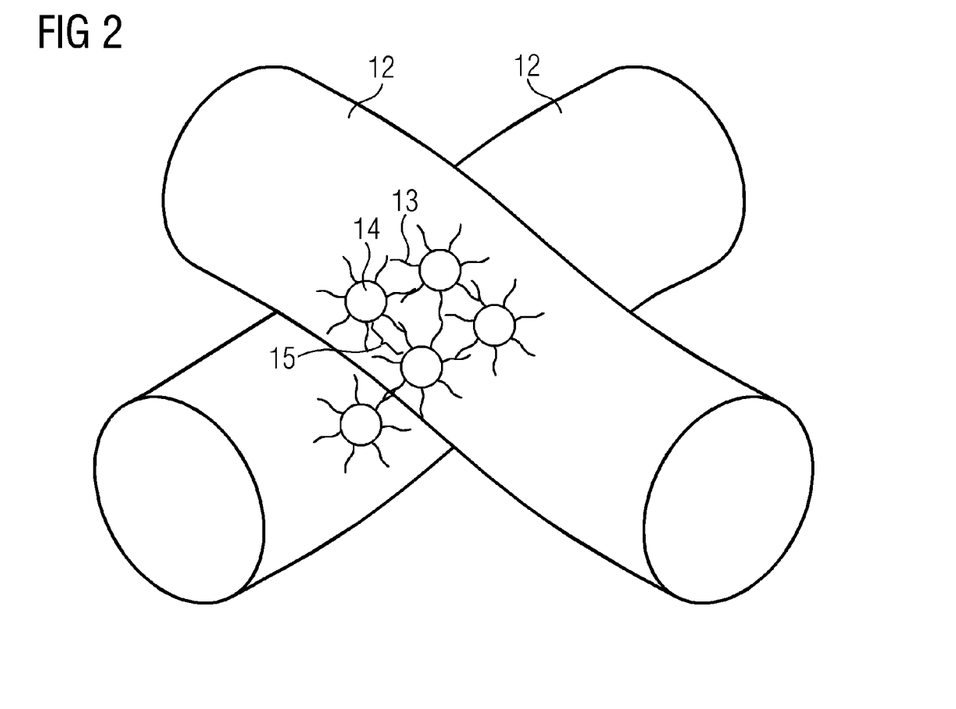
Figure 3:
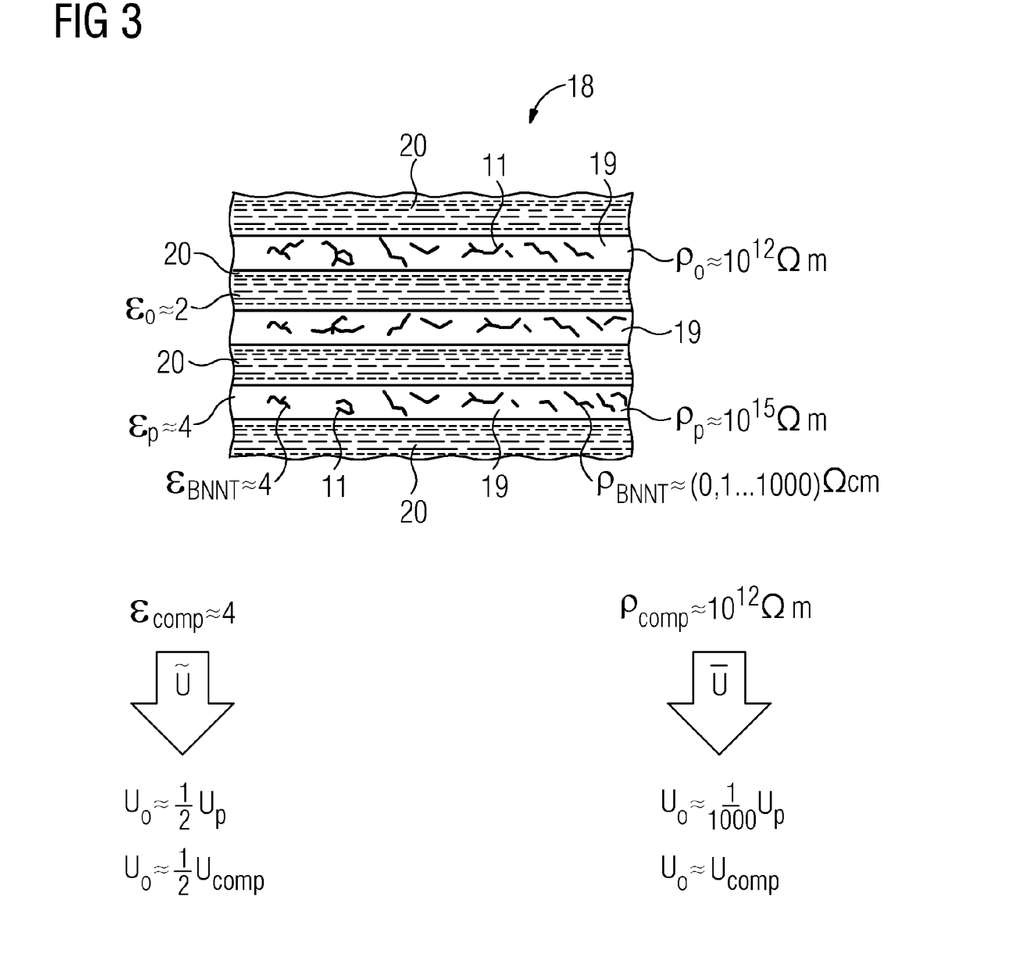
FIG. 3 shows an example of the nanocomposite of the invention in section, as is used as insulation in a transformer, with the voltages to which the insulation material is subject being shown schematically.

Two cellulose fibers 12 are also shown in FIG. 2. Here, however, spherical nanoparticles 14 which are functionalized by means of the polymer 13 in the manner indicated in FIG. 2 are used. Here too, polymerization of the polymer 13 leads to bridges 15 being formed between the nanoparticles 14, and these bridges 15 lead to an improvement in the electrical conductivity and thus a reduction in the specific resistance of the cellulose material An electrical insulation material 18 as shown in FIG. 3 comprises a plurality of layers of paper 19 as cellulose material, between which oil layers 20 are located. The papers 19, too, are impregnated with oil, which is not shown in more detail in FIG. 3. On the other hand, the impregnation with BNNTs 11 can be seen within the papers in FIG. 3. The insulation shown in FIG. 3 surrounds, for example in a transformer, the windings used there which have to be electrically insulated from the surroundings and from one another.

The electrical insulation of a transformer has to prevent dielectric breakdowns when an alternating voltage is applied during operation. In this case, the insulation behavior of the insulation depends on the permittivity of the components of the insulation. In the case of oil, relative permittivity $\in_o$ is approximately 2, and that of paper $\in_p$ is 4. When the insulation is subjected to an alternating voltage, the voltages to which the individual insulation components are subject are such that the voltage $U_o$ across the oil is approximately twice the voltage $U_p$ across the paper. If the nanocomposite of the invention, in which the paper 19 has been impregnated with BNNTs in the manner shown in FIG. 3, is used, the BNNTs do not influence the voltage distribution in the insulation according to the invention since the relative permittivity $\in_{BNNT}$ is likewise approximately 4 and the permittivity $\in_{comp}$ of the impregnated paper is also about 4. Thus, in the case of the insulation according to the invention, the voltage $U_o$ to which the oil is subject is approximately twice the voltage $U_{comp}$ across the nanocomposite (paper).

In the case of transformer malfunctions, the breakdown resistance of the insulation can be of importance when DC voltages are present. However, the distribution of the voltage across the individual constituents of the insulation is then no longer dependent on the permittivity but on the specific resistance of the individual components. The specific resistance $\rho_o$ of oil is $10^{12}$ Ωm. On the other hand, the $\rho_p$ of paper is about three orders of magnitude greater and is $10^{15}$ Ωm. As a result, the voltage at the oil $U_o$ is one thousand times the voltage at the paper $U_p$ when a DC voltage is applied. This imbalance incurs the risk that when the insulation is subjected to a DC voltage, breakdown occurs in the oil and the electrical insulation fails.

The specific resistance (in the range from 0.1 to 1000 Ωcm) of the BNNTs 11 introduced according to the invention into the paper 19 is set, e.g. by means of suitable coating of PEDOT:PSS and possibly by additional doping with dopants, so that the specific resistance of the paper $\rho_p$ is reduced. In this way, it is possible to set a specific resistance $\rho_{comp}$ of the composite of the invention which approaches the specific resistance $\rho_o$ and in the ideal case corresponds approximately to this. At a specific resistance $\rho_{comp}$ of about $10^{12}$ Ωm, the voltage $U_o$ across the oil is in the region of the voltage $U_{comp}$ across the composite, so that a balanced voltage profile is established in the insulation. This advantageously improves the breakdown resistance of the insulation since the stress on the oil is appreciably reduced.

Figure 4:
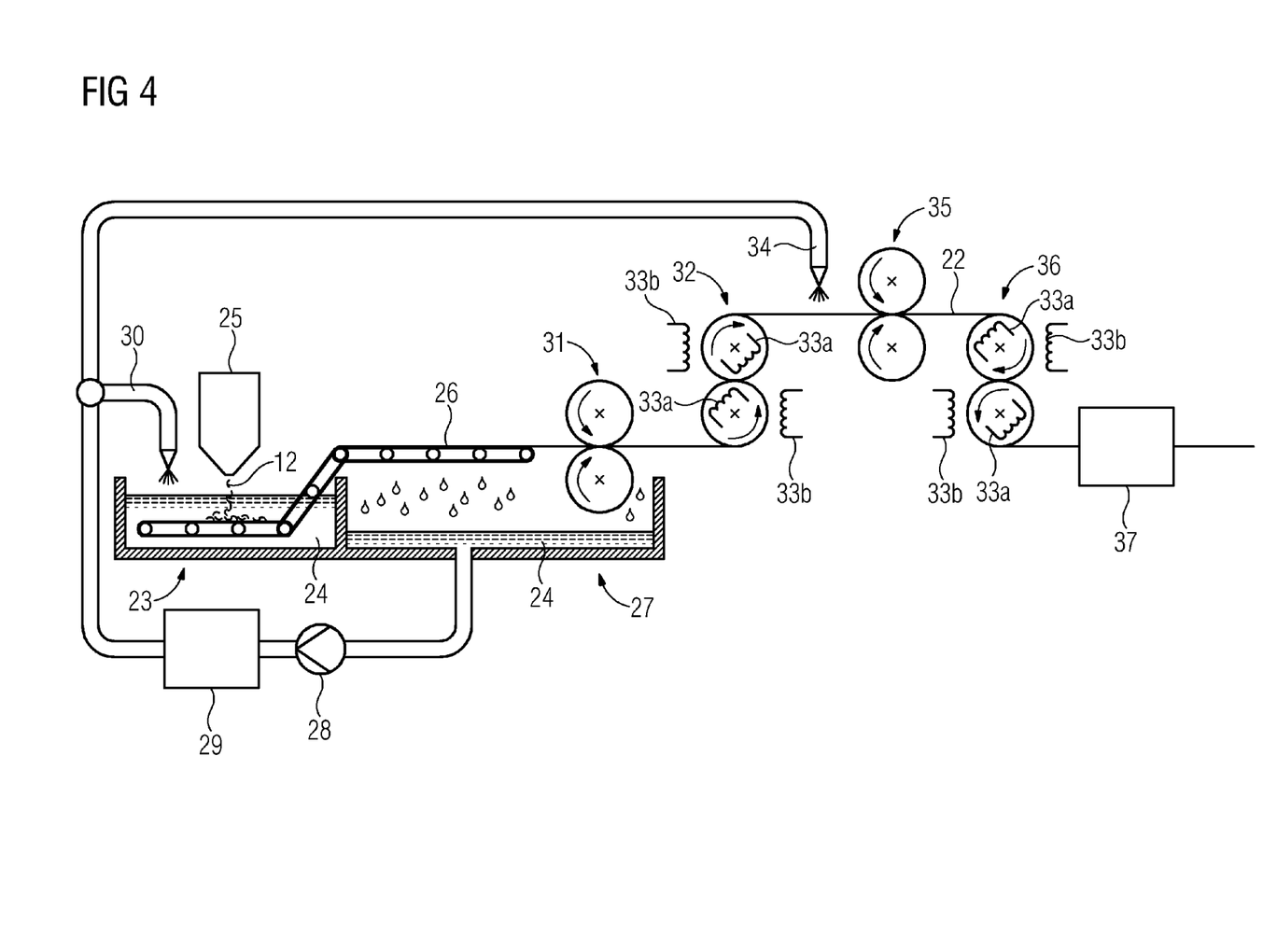
FIG. 4 shows an example of the process of the invention, illustrated schematically by a manufacturing plant in side view, and FIG. 5 schematically shows the change in the specific resistance of the nanocomposite according to the invention compared to nanocomposites according to the prior art as a function of the degree of fill with nanoparticles.

FIG. 4 shows a manufacturing plant for a cellulose material in the form of a paper strip 22 which is suitable for carrying out an example of the process of the invention. This plant has a first container 23 for an electrolyte 24, with ionomers of PEDOT and PSS and also nanoparticles in the form of BNNTs being present in the electrolyte. In addition, cellulose fibers 12 are sprinkled into the electrolyte 24 from a stock vessel 25. This produces, in a manner which is known per se and is therefore not discussed in more detail, a pulp in the electrolyte 24, which is deposited on a mesh-like conveyor belt 26. This conveyor belt leads into a second container 27 where the electrolyte 24 can drift off, forming an already partially dewatered mat from the cellulose fibers. The electrolyte is fed via a pump 28 to a reconditioning plant 29 where the required concentration of PEDOT and PSS and also of BNNTs is restored. The reconditioned electrolyte can be fed via a feed line 30 into the first container 23.

The electrolyte contains BNNTs as nanoparticles, with these being enveloped with the abovementioned ionomers PEDOT and PSS. This enveloping occurs in the electrolyte, and the nanoparticle can be additionally provided with a wetting agent so that they do not agglomerate before being enveloped with the ionomers. As an alternative, enveloping of the nanoparticles can also be effected in a manner not shown before introduction into the electrolyte. These can, for example, be milled together with the ionomers in a ball mill, or an ALD (atomic layer deposition) process is employed.

An aqueous BNNT dispersion containing 0.01% by weight of BNNTs in an aqueous electrolyte containing PEDOT and PSS can be produced as follows. A batch of 250 g of electrolyte requires 247.475 g of demineralized water, 2.5 g of a stock solution containing PEDOT and PSS in a concentration of 1% by volume and 0.025 g of BNNTs. To produce the dispersion, an ultrasonic probe (model VS 70T) having a diameter of 12.7 mm is used. The ultrasound is introduced at an amplitude power of 30% in pulses of 300 s each with a pause of 300 s between each of them. This prevents the dispersion from heating up to above 40° C. The treatment is continued for 35 minutes, and the measured energy input is then 60 KJ.

In the further course of the process, the paper strip 22 is produced from the cellulose material obtained. Firstly, further dewatering is carried out by means of a pair of rollers 31, with the electrolyte released in this dewatering step also being collected in the container 27. The paper strip 22 subsequently passes through a next pair of rollers 32, with a comparatively large wrap angle being achieved by the S-shaped travel of the paper strip around the pair of rollers. The pair of rollers is heated by means of the heating devices 33a indicated, so that heat can be transferred to the paper strip. Additional heating devices 33b can be used to support this. The heating devices 33a, 33b bring the paper strip to the polymerization temperature so that the ionomers polymerize to form PEDOT:PSS and the above-described network of nanoparticles enveloped with PEDOT:PSS is formed. Further dewatering also occurs during this treatment.

After polymerization of the ionomers, electrolyte can once again be applied to the paper strip via a further feed device 34, with the paper strip which has now been largely dewatered being absorbent enough for the cellulose fibers to be able to be impregnated with the electrolyte. The paper strip 22 subsequently runs through a further pair of rollers 35 and is dewatered again by means of these. Further dewatering and polymerization of the additionally introduced ionomers is achieved by means of a pair of rollers 36, with this pair of rollers being able to be heated by means of heating devices 33a, 33b in the manner described for the pair of rollers 32.

As soon as the paper strip 22 leaves the pair of rollers 36, the paper strip has been largely dewatered. However, it still has a residual water content and is therefore fed to a drying apparatus 37 and can be dried as required in this drying apparatus.

In addition, it should be pointed out that the specific resistance $\rho$ of the paper strip 22 produced depends not only on the content of PEDOT:PSS and of nanoparticles such as BNNTs but also on the residual water content. If the paper strip is to be used, for example, as electrical insulation in a transformer, it has to be impregnated with oil and must therefore contain virtually no water. This should be ensured by subsequently drying in the drying apparatus 37. The drying apparatus 37 can, for example, be configured as an oven.

Figure 5:
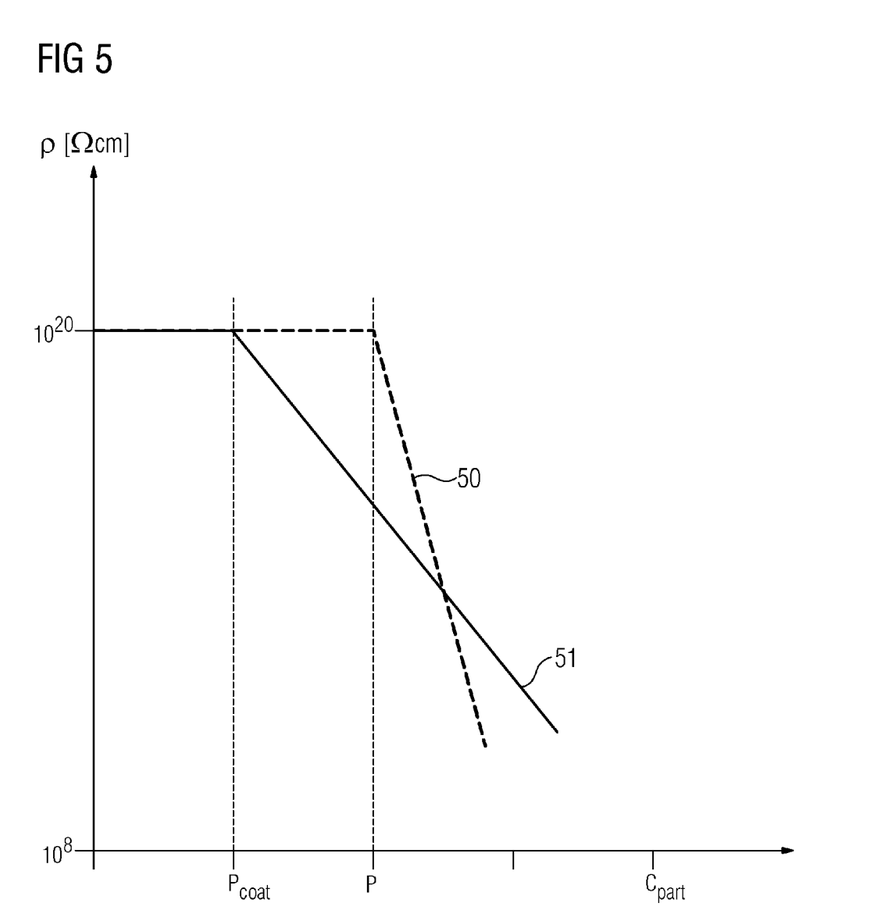

FIG. 5 shows how the change in the specific resistance $\rho$ (in $\Omega \cdot cm$) changes qualitatively as a function of the degree of fill of the cellulose material as a result of the use of the nanoparticles enveloped with PEDOT:PSS which are provided according to the invention. A curve 50 is obtained when nanoparticles according to the prior art (for example as described in U.S. 2007/0199729 A1) are used. Here, it can be seen that the resistance is about $10^{20}$ $\Omega cm$ and above a particular percolation threshold P decreases with increasing degrees of fills. This decrease is comparatively steep, so that the specific resistance is comparatively sensitive to concentration fluctuations in this range of degrees of fill (concentration $C_{part}$).

If, on the other hand, coated nanoparticles whose surface is formed by the electrically conductive polymer PEDOT:PSS are used, the effect of a reduction in the specific resistance caused by the particles is weakened by the formation of a conductive network in the matrix of the cellulose material. This means that the percolation threshold $P_{coat}$ is lower and subsequently, as the curve 51 shows, a decrease in the specific resistance $\rho$ as a function of the concentration of particles $C_{part}$ is less steep. This also means that, firstly, lowering of the specific resistance requires a smaller amount of nanoparticles, resulting in improved economics at least when using expensive nanoparticles such as BNNTs. In addition, the specific resistance can be set more precisely via the concentration because of the less steep decrease in the specific resistance.

The invention claimed is:

1. A nanocomposite, comprising:
   an electrically insulating material having a material composed of cellulose fibers; and
   nanoparticles selected from the group consisting of semiconducting nanoparticles and nonconductive nanoparticles dispersed in said electrically insulating material, at least some of said nanoparticles dispersed in said electrically insulating material have a shell composed of an electrically conductive polymer, said nanoparticles permeating an entire agglomerate of said cellulose fibers thus forming an electrically conductive network.

2. The nanocomposite according to claim 1, wherein said nanoparticles are boron nitride nanotubes (BNNTs).

3. The nanocomposite according to claim 1, wherein said electrically conductive polymer is a mixture of a positively charged ionomer and a negatively charged ionomer.

4. The nanocomposite according to claim 3, wherein said positively charged ionomer is selected from the group consisting of poly(3,4-ethylenedioxythiophene) (PEDOT) and polyaniline (PANI).

5. The nanocomposite according to claim 3, wherein said negatively charged ionomer is a polystyrenesulfonate (PSS).

6. A method for formulating a nanocomposite, which comprises the steps of:
providing nanoparticles selected from the group consisting of semiconducting nanoparticles and nonconductive nanoparticles, at least some of the nanoparticles having a shell composed of an electrically conductive polymer;
dispersing the nanoparticles in an electrically insulating material containing cellulose fibers, the nanoparticles permeating an entire agglomerate of the cellulose fibers thus forming an electrically conductive network; and
using the electrically insulating material as an insulating material for a transformer.

7. A process for producing a cellulose material forming a nanocomposite, which comprises the steps of:
producing an aqueous electrolyte from ionomers including a positively charged ionomer and a negatively charged ionomer;
dispersing in the aqueous electrolyte nanoparticles selected from the group consisting of semiconducting nanoparticles and nonconductive nanoparticles;
performing one of mixing in cellulose fibers into the aqueous electrolyte or impregnating the aqueous electrolyte with the cellulose fibers, the nanoparticles permeating an entire agglomerate of the cellulose fibers thus forming an electrically conductive network;
removing water from the aqueous electrolyte at least to such an extent that a cellulose material is formed; and
cross-linking the ionomers.

8. The process according to claim 7, which further comprises selecting the positively charged ionomer from the group consisting of poly(3,4-ethylenedioxythiophene) (PEDOT) and polyaniline (PANI).

9. The process according to claim 7, wherein the removal of the water is supported by rolling of the cellulose material before the cross-linking of the ionomers.

10. The process according to claim 7, which further comprises performing a complete drying of the cellulose material after the cross-linking of the ionomers.

11. The process according to claim 7, which further comprises supporting at least one of a removal of the water or the cross-linking of the ionomers by pressing-on of heated rollers.

12. The process according to claim 7, which further comprises treating the nanoparticles with a wetting agent before the nanoparticles are dispersed in the aqueous electrolyte.

13. The process according to claim 7, which further comprises producing the cellulose material by laminating a plurality of previously impregnated layers.

14. The nanocomposite according to claim 7, which further comprises providing a polystyrenesulfonate (PSS) as the negatively charged ionomer.

15. The nanocomposite according to claim 7, which further comprises providing boron nitride nanotubes (BNNTs) as the nanoparticles.

* * * * *